United States Patent [19]

O'Shaughnessy

[11] Patent Number: 5,318,685
[45] Date of Patent: Jun. 7, 1994

[54] METHOD OF MAKING METAL OXIDE FILMS HAVING BARRIER PROPERTIES

[75] Inventor: Roger D. O'Shaughnessy, Chaska, Minn.

[73] Assignee: Cardinal IG Company, Minnetonka, Minn.

[21] Appl. No.: 999,542

[22] Filed: Dec. 31, 1992

Related U.S. Application Data

[63] Continuation of Ser. No. 837,086, Feb. 18, 1992, abandoned, which is a continuation of Ser. No. 707,243, May 22, 1991, abandoned, which is a continuation of Ser. No. 576,124, Aug. 28, 1990, abandoned, which is a continuation of Ser. No. 465,555, Jan. 16, 1990, abandoned, which is a continuation of Ser. No. 355,131, May 11, 1989, abandoned, which is a continuation of Ser. No. 144,324, Jan. 14, 1988, abandoned, which is a continuation of Ser. No. 86,909, Aug. 18, 1987, abandoned.

[51] Int. Cl.$^5$ .............................................. C23C 14/34
[52] U.S. Cl. ........................... 204/192.27; 204/192.26; 204/192.15
[58] Field of Search ................ 204/192.15, 192.16, 204/192.22, 192.26, 192.27, 192.28, 192.29

[56] References Cited

U.S. PATENT DOCUMENTS

| | | | |
|---|---|---|---|
| 3,519,339 | 7/1970 | Hutchinson et al. | 351/44 |
| 3,649,359 | 3/1972 | Apfel et al. | 117/33.3 |
| 4,045,125 | 8/1977 | Farges | 350/166 |
| 4,179,181 | 12/1979 | Chang | 350/1.7 |
| 4,322,276 | 3/1982 | Meckel et al. | 204/192.27 X |
| 4,413,877 | 11/1983 | Suzuki et al. | 204/192.15 X |
| 4,462,883 | 7/1984 | Hart | 204/192.27 X |
| 4,497,700 | 2/1985 | Groth et al. | 204/192.27 |
| 4,532,181 | 7/1985 | Brill et al. | 428/336 |
| 4,548,691 | 10/1985 | Dietrich et al. | 204/192.27 |
| 4,716,086 | 12/1987 | Gillery et al. | 428/630 |
| 4,806,220 | 2/1989 | Finley | 204/192.27 |
| 4,902,081 | 2/1990 | Huffer | 350/1.7 |

FOREIGN PATENT DOCUMENTS

| | | |
|---|---|---|
| 0219073 | 4/1987 | European Pat. Off. |
| 1270586 | 4/1972 | United Kingdom |
| 1370504 | 10/1974 | United Kingdom |

Primary Examiner—Nam Nguyen
Attorney, Agent, or Firm—Fredrikson & Byron

[57] ABSTRACT

A layer of silver metal or the like, included as one of a plurality of transparent coating layers upon a glass pane, is protected from staining by providing the pane with a barrier layer comprising the oxides of at least two metals of which one is Me(1) and another is Me(2) wherein Me(1) is titanium, zirconium or hafnium and Me(2) is zinc, tin, indium or bismuth. The barrier layer is nontransmissive of moisture and other staining agents, is amorphous and is free of grain boundaries.

10 Claims, 1 Drawing Sheet

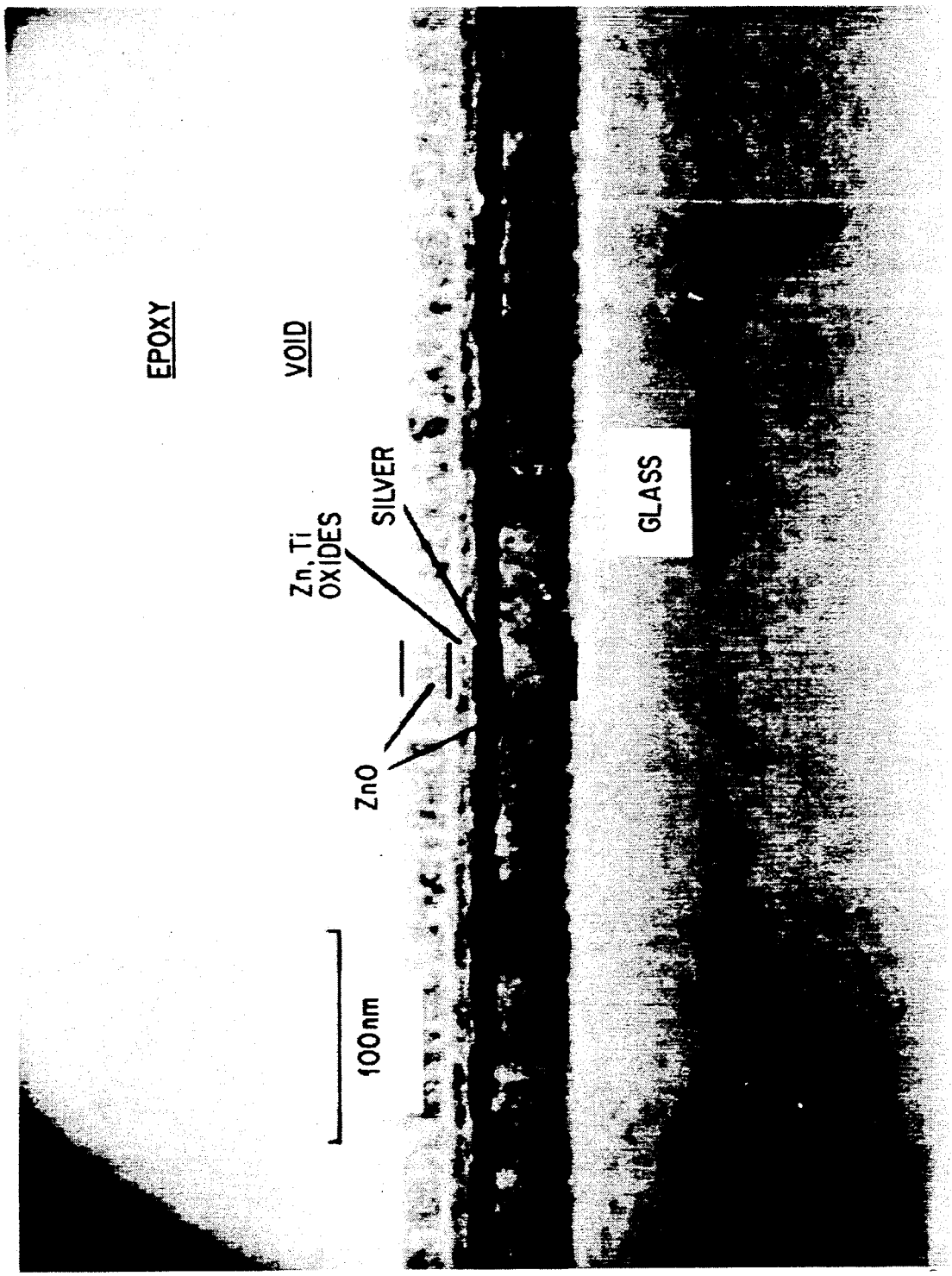

METHOD OF MAKING METAL OXIDE FILMS HAVING BARRIER PROPERTIES

REFERENCE TO RELATED APPLICATIONS

This application is a continuation, of application Ser. No. 07/837,086, filed Feb. 18, 1992, and of 07/707,243 filed May 22, 1991; 07/576,124, filed Aug. 28, 1990; 07/465,555 filed Jan. 16, 1990; 07/355,131, filed May 11, 1989; 07/144,324 filed Jan. 14, 1988; and of 07/086,909 filed Aug. 18, 1987, all abandoned.

FIELD OF THE INVENTION

This invention relates to metal oxide films which have barrier properties and particularly to such films as are deposited by sputtering upon coated glass substrates.

BACKGROUND OF THE INVENTION

In the manufacture of glass panes for use in windows, it is common to lay down a deposit, usually by sputtering techniques, of a thin film of a metal such as silver or copper to change the reflectance and absorbance characteristics of the glass pane. Reference is made to U.S. Pat. No. 4,462,884 (Gillery, et al.) with respect to the production of silver/copper films by cathode sputtering, and to U.S. Pat. No. 4,166,018 (Chapin) with respect to the method of coating a substrate utilizing a cathode sputtering technique involving a magnetic field to improve the sputtering efficiency.

Thin, transparent films of silver, copper and the like are susceptible to corrosion (e.g., staining) when they are brought into contact, under moist or wet conditions, with various staining agents such as atmosphere carried chlorides, sulfides, sulfur dioxide and the like. Films of this type commonly are employed on inner surfaces of multi pane glass units so that the films are maintained in a dry condition by desiccants or the like that remove moisture from the interpane spaces. Staining can occur, however, when coated panes of glass are stored for later fabrication into insulating glass units. To avoid staining during storage, sheets of treated paper have been employed between coated glass panes to prevent moisture and staining agents such as those described above from coming into contact with the coated metal films. Treated paper interliners of this type commonly are used but once. The paper interliner cost, plus the additional labor required to insert and remove the paper liners, adds significantly to the cost of the coating and fabricating process.

To avoid the use of a treated paper interliner, it has been proposed to add to the coated panes, as an outer layer, a thick coating (100-120 Angstroms) of titanium dioxide, deposited by sputtering from a titanium metal target in the presence of oxygen. Titanium dioxide layers of at least this thickness have been found to serve as barriers, restraining corrosive or staining agents such as those described above from penetrating through them and coming into contact with the one or more metal layers therebeneath. The deposition of such thick coatings of titanium dioxide, however, has given rise to other problems. Titanium dioxide can be sputtered, as above described, only very slowly. That is, the rate of deposition is quite low. This, in turn, greatly reduces the speed at which glass panes can be provided with a series of coatings in a single coating apparatus, and consumes large quantities of electric power.

SUMMARY OF THE INVENTION present invention is based upon the discovery that an easily deposited and highly effective barrier layer can be provided by depositing as a single, substantially amorphous integral coating, the oxides of at least two metals of which one oxide is an oxide of Me(1) and another oxide is an oxide of Me(2) wherein Me(1) is titanium, zirconium or hafnium and Me(2) is zinc, tin, indium or bismuth. Desirably, the barrier layer is overcoated with a detectable separate layer of an oxide of Me(2).

In one embodiment, the invention relates to a coated glass pane having a plurality of transparent layers thereon and including a metal layer susceptible to staining in the presence of moisture and a staining agent, the plurality of layers including a barrier layer spaced further from the surface of the glass pane than the metal layer, the barrier layer being substantially amorphous, generally free of grain boundaries and substantially non-transmissive of moisture and staining agents, the barrier layer comprising oxides of at least two metals of which one oxide is an oxide of Me(1) and another oxide is an oxide of Me(2).

In another embodiment, the invention relates to a method for protecting a stain susceptible metal layer carried as one of a plurality of layers upon a glass pane surface, the method comprising depositing, as a barrier layer spaced further from the surface of the glass pane than the metal layer, a layer that is non transmissive of moisture or staining agents and which comprises a substantially amorphous blend of metal oxides of which one is an oxide of Me(1) and another is an oxide of Me(2), as described above. The barrier layer, which is substantially free of grain boundaries, desirably is produced by the sequential steps, taken in any sequence, of depositing an oxide of Me(1) via sputtering from a target of Me(1) in the presence of oxygen, and depositing an oxide of Me(2) via sputtering of an Me(2) target in the presence of oxygen. Desirably, the glass pane is provided with another separate protective layer of an oxide of Me(2) spaced further from the glass pane than the barrier layer and preferably resulting from the sputtering of an oxide of Me(2) upon the barrier layer.

The barrier layers employed in the invention desirably ar at least 70 Angstroms (A) in thickness and preferably are not less than about 115 A in thickness. The Me(1) oxide, preferably $TiO_2$, is present in the barrier layer in reasonably large amounts; the ratio of the "apparent" thickness of the Me(1) oxide to the total apparent thickness of the barrier layer is at least about ⅓ and preferably is not less than about 39%. The "apparent" thickness of a specific layer is that approximate thickness that would result if that layer were deposited by itself, taking into consideration the mass of material deposited and its approximate density.

In comparison to the prior art method described above in which a thick protective layer of titanium dioxide is deposited by sputtering to form a protective coating, the method of the present invention utilizing the same sputtering apparatus is substantially faster and requires less electric energy.

BRIEF DESCRIPTION OF THE DRAWING

FIG. 1 is a photographic cross-sectional view of a coated glass pane of the invention produced by cross-sectional transmission electron microscopy.

DETAILED DESCRIPTION

Stain susceptible metal layers such as silver or copper may be deposited by sputtering, as noted above, upon the surface of a pane of glass or other substrate. The glass surface so coated with silver or copper may initially contain one or more other layers of materials. An initial anti reflecting layer of zinc oxide, for example, may be deposited upon a glass pane followed by the deposition of silver or copper thereon. U.S. Pat. No. 4,563,400 (Criss, et al.) discloses the use of a primer layer of stainless steel or other metal. The thickness of the copper or silver layer may be varied as needed to provide the desired reflectance and absorbance characteristics.

If oxide layers are to be later deposited over the metal layer, then it is appropriate to utilize a thin, sacrificial layer of, e.g., titanium metal directly over the silver or copper layer, this metal layer becoming oxidized during subsequent steps in which a metal is sputtered in the presence of oxygen and serving to protect the silver or copper layer from becoming oxidized.

The barrier layer of the invention is positioned further from the glass pane surface than is the silver or copper metal layer so that the barrier layer serves to protect the metal layer from corrosion. Desirably, the barrier layer is positioned directly atop the sacrificial layer of e.g., titanium metal previously described.

The barrier layer consists of metal oxides comprising at least one oxide chosen from the oxides of Me(1) and at least one oxide chosen from the oxides of Me(2). Me(1) may be titanium, zirconium or hafnium, preferably titanium. These oxides, then, are $TiO_2$, $ZrO_2$ and $HfO_2$ Zirconium oxide and hafnium oxide are less preferred because of their expense. The Me(2) oxides are oxides of zinc, tin, indium or bismuth, and take the form of $ZnO$, $SnO_2$, $In_2O_3$ and $Bi_2O_3$. Of these, zinc and tin oxides are preferred and zinc oxide, because of its relatively high deposition rate and consequent reduced expense, is most preferred. Several Me(1) oxides and several Me(2) oxides may be employed if desired. For example, the mixed oxides of zinc and tin may be employed as the Me(2) oxide.

The barrier layer, which may be thought of as a blend of Me(1) and Me(2) oxides, is substantially amorphous, although it may show some evidence of microcrystalinity. It is substantially free of grain boundaries that extend directly through the layer; to the extent that the barrier layer contains grain boundaries, they are believed to interconnect in such a tortuous pattern as to render the migration of a corrosion agent therethrough extremely difficult. The barrier layer also appears to be homogeneous; electron microscopy fails to show separate phases of Me(1) and Me(2) oxides.

The preferred method of producing the barrier layer employs a sputtering technique such as described in U.S. Pat. No. 4,166,018 (Chapin), the teachings of which are incorporated herein by reference. The technique, sometimes referred to as a magnetron sputtering technique, involves the formation of a plasma which is contained by a magnetic field and which serves to eject metal atoms from an adjacent metal target, the metal atoms being deposited upon an adjacent surface such as the surface of a glass pane. When sputtering is done in an atmosphere of an inert gas such as argon, the metal alone is deposited whereas if sputtering is done in the presence of oxygen, e.g., in an atmosphere of argon and oxygen, then the metal is deposited as an oxide. Magnetron sputtering techniques and apparatuses are well known and need not be described further.

In the preferred method of the invention, the barrier layer is provided with a protective overlayer which is believed to contribute barrier characteristics while physically protecting the layers beneath it. The barrier and separate overlayer may be provided by depositing upon a suitable substrate, and in sequence, an Me(2) metal in an oxygen containinq atmosphere, an Me(1) metal in an oxygen-containinq atmosphere, and an Me(2) metal in an oxygen-containing atmosphere. The barrier that results consists of the barrier layer, which may be considered a blend of Me(1) and Me(2) oxides, with a contiguous but separately identifiable overlayer of the last mentioned Me(2) oxide.

Particularly preferred is a barrier layer in which Me(1) is titanium and Me(2) is zinc. A particularly corrosion resistant system results from the deposition upon a glass pane, by sputtering in a magnetic field as described above, of a first anti-reflecting layer of zinc oxide to a thickness of about 400 A, a silver metal layer at a thickness of about 100 A, a very thin layer of titanium metal sputtered in an argon atmosphere, followed by successive coatings via sputtering, of zinc, titanium and zinc, in oxygen-containing atmospheres such as mixtures of argon and oxygen, the resulting coating having a protective zinc oxide outer layer. When viewed by cross-sectional transmission electron microscopy ("XTEM"), the outer zinc oxide coating appears columnar with evident grain boundaries, whereas the barrier layer immediately underneath, comprising Me(1) and Me(2) oxides, lacks observable grain boundaries.

In practice, it is desired that the Me(1) and Me(2) oxides be applied separately by sputtering from targets of Me(1) and Me(2) metals in an oxygen containing atmosphere. The resulting barrier layer may, however, result from the simultaneous sputtering upon a substrate of two or more different metal targets, or may result from the sputtering from a target made of an alloy of two or more metals, as desired. The latter route may be particularly advantageous when the Me(2) metals zinc and tin are to be employed, the ratios of zinc and tin ranging from substantially 100% tin to substantially 100% zinc.

In the specific example referred to above, the outer zinc oxide coating layer was of a thickness of about 300 A, when viewed in cross sectional transmission electron microscopy, and the barrier layer comprising the blend of oxides appeared to be approximately 130 A in thickness. The very thin titanium metal (converted to oxide) layer that was coated upon the silver metal layer was not observed and may well have been incorporated in the blend of Me(1) and Me(2) oxides.

The blend of Me(1) and Me(2) oxides may, of course, contain certain stoichiometric ratios of Me(1)-Me(2)-$O_X$ materials such as $Zn_2TiO_4$, $ZnTiO_3$, etc. When Me(1) is titanium and Me(2) is zinc, then the mixture of oxides may be a blend of $Zn_2TiO_4$ and $ZnO$. Reference is made to F. H. Dulin and D. E. Rase, *J. Am. Ceram. Soc.*, 43[3] 130 (1960), particularly FIG. 303 which shows the phase diagram of $ZnO-TiO_2$, the teachings of which are incorporated herein by reference.

In practice, glass panes desirably are carefully cleaned and are then provided with a direct coating of an Me(2) metal, desirably zinc oxide, followed by a coating of a metal such as silver or copper. As noted above, a very thin, sacrificial metal layer (preferably titanium) is then applied, followed directly by the barrier layer which i sputtered onto the surface of the metal sacrificial layer. The barrier layer desirably is produced by sputtering, in sequence, zinc in an oxygen-containinq atmosphere and titanium in an oxygen containing atmosphere. Finally, zinc may be sputter coated in an oxygen-containing atmosphere to form a contiguous, separate protective overlayer. The thicknesses of the various layers that are thus deposited are selected as desired to produce an appropriate barrier layer and to provide the appropriate color, degree of light transmission, etc.

The relative amounts of Me(1) and Me(2) oxides employed in the barrier layer are chosen to render the barrier layer substantially amorphous and free from grain boundaries (when viewed via cross-section transmission electron microscopy at about 300,000 X). Some Me(1) and Me(2) oxide materials may be supplied by earlier or subsequently applied layers of such oxides. In the specific example referred to above, some of the $TiO_2$ component of the barrier layer likely was supplied by the sacrificial titanium metal layer that was subsequently oxidized. Similarly, some of the ZnO component of the barrier layer may have been supplied by the subsequently applied ZnO protective layer. In any event, sufficient Me(1) oxide and Me(2) oxide are present in the barrier layer (which is a separately identifiable layer) so that the layer is generally homogeneous, amorphous, and devoid of grain boundaries as explained above, and further is of sufficient thickness, as to render the layer substantially non-transmissive of moisture and staining agents as determined by the exposure of coated glass panes to U.V. light and moisture at elevated temperatures as described below.

Although it is difficult to measure precisely the amounts of Me(1) and Me(2) oxides in a barrier layer, these quantities can be closely approximated from experience in depositing individual layers of Me(1) and Me(2) oxides upon substrates. The thickness of an oxide layer depends upon the quantity of oxide deposited per unit area and the density of the deposited layer; the quantity of oxide deposited is a function of the metal selected, rate of power consumption and rate of travel of a glass pane beneath the metal sputtering target. The experiential relationship of these parameters to measured oxide layer thickness enables one to predict with reasonable accuracy the thickness of a sputtered layer from knowledge of the above parameters. As used herein, "apparent" thickness means the thickness of an oxide film that would be obtained if the film were separately sputtered upon a substrate.

The relative quantities of Me(1) and M (2) oxides employed in the barrier layer thus can be expressed in terms of the "apparent" thickness resulting from each oxide if it was applied as a separate layer upon a substrate. Barrier layers of the invention desirably are characterized by having a ratio of the apparent thickness of Me(1) oxide to the total apparent thickness of the barrier layer of at least about ⅓ and preferably at least about 0.39. Also, the apparent total barrier layer thickness desirably is not less than about 70 A and preferably is about 115 A or greater.

The following illustrative example will serve to explain the invention in greater detail.

Example 1

Glass panes, suitably cleaned, were subjected to magnetron sputtering procedures from a series of target cathodes. The amount of each material that was thus sputter coated was controlled by varying the number of cathodes beneath which the glass panes were passed during the coating operation. The apparent thicknesses of the materials that were thus deposited are summarized in Table 1 below.

The surface of each glass pane was first coated with zinc oxide (utilizing a zinc cathode in an oxygen atmosphere) to an apparent thickness of 375 A to provide an antireflective layer. Subsequent measurement utilizing cross-section transmission electron microscopy ("XTEM") showed this layer to be approximately 450 A in thickness. Over the thus described zinc oxide layer was deposited silver metal to an apparent thickness of 150 A (measured by XTEM at 155 A), followed by a sacrificial layer of titanium metal. The latter layer was oxidized by the subsequent sputtering process, and the titanium oxide layer that resulted from the sacrificial layer had an apparent thickness of 20 A. The sacrificial titanium metal coating was then sequentially overcoated with a zinc oxide layer and a titanium dioxide layer at apparent thicknesses of 100 Angstroms and 45 Angstroms, respectively, to produce a barrier layer. The actual thickness of the barrier layer, measured by XTEM, was approximately 160 A, whereas the apparent thickness of the barrier layer (20 A plus 100 A plus 45 A) was 165 A. A final layer of zinc oxide was applied at an apparent thickness of 250 Angstroms (XTEM measured at 300 Angstroms). The resulting coated glass pane was exposed to the weathering test device described below, and no evidence of corrosion occurred in 24 hours.

The outer surface of the pane was coated with an epoxy resin, and the coating was subjected to cross sectional transmissional electron beam microscopy by known techniques to yield the photograph appearing in FIG. 1. Transmission electron defraction studies identified the layers as labeled on the photograph. The anti reflection zinc oxide film initially deposited upon the glass surface appears as a well defined layer, as does the darker layer of metallic silver upon the initial zinc oxide layer. A well defined barrier layer appears upon the silver layer, the barrier layer consisting of oxides of zinc and titanium. Note should be made of the absence of the sacrificial titanium metal (oxidized to the oxide) layer that was applied immediately above the silver layer; it appears that this layer has combined with the subsequently applied zinc and titanium oxide layers to form the generally homogeneous barrier layer. Upon the barrier layer is shown a separately detectable zinc oxide layer as an outer protective layer. The crystalline, columnar structure of the outer zinc oxide layer is clearly shown in the photograh, as are grain boundaries extending through the layer. The barrier layer, in contrast, does not exhibit any grain boundaries, nor does it exhibit a crystalline structure but rather appears to be amorphous. As mentioned earlier, the oxides present in the barrier layer may be a blend of separate Me(1) and Me(2) oxides or may involve more complex oxides such as $Zn_2TiO_4$ containing ZnO and $ZnTiO_3$ containing $TiO_2$, etc.

Spaced above the outer zinc oxide layer is an epoxy resin layer, applied during preparation of the sample for electron microscopy.

The thus-described specimen is identified as "A" in Table 1. Specimens "B", "C", "D", and "E" also were obtained by varying the apparent thickness of the zinc oxide and titanium dioxide layers that were applied directly beneath the outer zinc oxide protective layer.

Example B differed from Example A in that apparent thicknesses of the zinc oxide layer applied atop the titanium metal sacrificial layer was reduced by one-half; good corrosion resistance yet was demonstrated by the resulting barrier layer, which had an apparent thickness of approximately 115 A. In specimen D, the apparent thickness of the titanium dioxide layer was reduced to 25 A, whereas the apparent thickness of the zinc oxide layer remained at 100 A. Although the apparent thickness of the barrier layer was 145 A, the ratio of the apparent thickness of the titanium dioxide layer to that of the total barrier layer was 0.31. Poor corrosion resistance was measured.

In specimen C, the titanium dioxide layer was further reduced in thickness to 15 A, but the zinc oxide layer was increased in thickness to 230 A, yielding an apparent total thickness of the barrier layer of 265 Angstroms but a ratio of titanium dioxide apparent thickness to total apparent thickness of the barrier layer of only 0.13. Again, poor corrosion resistance was measured. Specimen E shows the results of maintaining the apparent thickness of the titanium dioxide layer a 45 A but omitting the zinc oxide layer. The thickness of the barrier layer was thus reduced to 65 Angstroms; poor corrosion resistance was noted.

TABLE 1

| No. | Layer | A | B | C | D | E |
|---|---|---|---|---|---|---|
| (6) | ZnO(Me(2)Oxide), Apparent Thickness: | 250 A[1] | 250 A | 250 A | 250 A | 250 A |
| (5) | $TiO_2$(Me(1)Oxide), Apparent Thickness: | 45 A | 45 A | 15 A | 25 A | 45 A |
| (4) | ZnO Apparent Thickness: | 100 A[2] | 50 A | 230 A | 100 A | 0 |
| (3) | $Ti(O_2)$ Apparent Thickness: | 20 A | 20 A | 20 A | 20 A | 20 A |
| (2) | Silver Metal, Apparent Thickness: | 150 A[3] | 150 A | 150 A | 150 A | 150 A |
| (1) | ZnO, Apparent Thickness: | 375 A[4] | 375 A | 375 A | 375 A | 375 A |
| Results: | | Good corrosion resistance | Good corrosion resistance | Poor corrosion resistance | Poor corrosion resistance | Poor corrosion resistance |

[1] Measured, XTEM, at approximately 300 A
[2] Barrier layer, comprising layers (3), (4) and (5) measured, XTEM, at approximately 160 A
[3] Measured, XTEM, at approximately 155 A
[4] Measured, XTEM, at approximately 450 A A comparison, in terms of rate of throughput of glass panes and power consumption, was made between the process yielding specimen A as shown in Table 1 and another process which eliminated layers 4, 5 and 6 in Table 1 and substituted therefor titanium dioxide at an apparent thickness of 120 Angstroms, in accordance with the prior art process described above. The thick titanium dioxide layer was applied using multiple titanium metal cathodes. The same sputtering apparatus was employed for each run. Whereas the throughput rate of the prior art process was approximately 180 inches per minute, the throughput rate of the glass panes of specimen A, which utilized less electric power, was approximately 260 inches per minute, and thus resulted in an increase in through-put rate of about 44%. The ability to thus increase the production rate, and eliminate the use of paper spacers between panes, is of substantial commercial importance.

It will be understood that glass panes so coated commonly are employed in an insulating glass unit in which the panes are spaced from one another to define an interpane space which is commonly filled with a dry gas such as argon, the coated surfaces of the panes facing one another and hence no longer being exposed to airborne corrosive agents such as $SO_2$, water vapor and the like.

An appropriate test for determining the barrier properties of the barrier layer involves placing coated panes within a weathering test device in which the panes are exposed to ultraviolet light in a high moisture environment at a temperature of, e.g., 190° F. (about 88° C.). The onset of corrosion or staining commonly is observed by the development of small, colored spots in the coating layer which can be visually observed without magnification. Glass panes coated in accordance with the invention commonly are capable of withstanding 24 hours in the test device without noticeable change.

While a preferred embodiment of the invention has been described, it should be understood that various changes, adaptations and modifications may be made therein without departing from the spirit of the invention and the scope of the appended claims.

What is claimed is:

1. A method for protecting a stain-susceptible metal layer carried as one of a plurality of substantially transparent layers upon the surface of a glass pane, comprising forming an overcoat substantially non-transmissive of staining agents by the sequential steps of depositing a first layer of an oxide of a metal Me(2) via sputtering, depositing an oxide of a metal Me(1) via sputtering, and depositing a second layer of an oxide of a metal Me(2), wherein Me(1) is titanium, zirconium or hafnium and Me(2) is zinc, tin, indium or bismuth.

2. The method of claim 1 wherein the Me(1) oxide layer is applied at a thickness of not less than about 45 Angstroms.

3. The method of claim 2 wherein said layers of oxides are deposited via sputtering of a metal target in an oxygen atmosphere.

4. The method of claim 1 wherein Me(1) is titanium and Me(2) is zinc.

5. The method of claim 1 further comprising the step of applying a sacrificial layer of a metal Me(1) prior to depositing said first layer of an Me(2) oxide.

6. The method of claim 1 wherein the Me(1) oxide layer is applied at a thickness of not less than about 45 Angstroms and the first Me(2) oxide layer is applied at a thickness of not less than about 50 angstroms.

7. The method of claim 6 further comprising the step of applying a sacrificial layer of a metal Me(1) prior to depositing said first layer of an Me(2) oxide.

8. A method for protecting a stain-susceptible metal layer carried as one of a plurality of substantially transparent layers upon the surface of a substrate, comprising forming an overcoat substantially non-transmissive of staining agents by the sequential steps of depositing by sputtering a first layer of an oxide of a metal Me(2), depositing by sputtering an oxide of a metal Me(1) at a thickness of not less than about 45 angstroms, and depositing by sputtering a second layer of an oxide of a metal Me(2), wherein Me(1) is titanium, zirconium or hafnium and Me(2) is zinc, tin, indium or bismuth.

9. The method of claim 8 wherein the first Me(2) oxide layer is applied at a thickness of not less than about 50 angstroms.

10. The method of claim 8 wherein Me(1) is titanium and Me(2) is zinc.

* * * * *